…

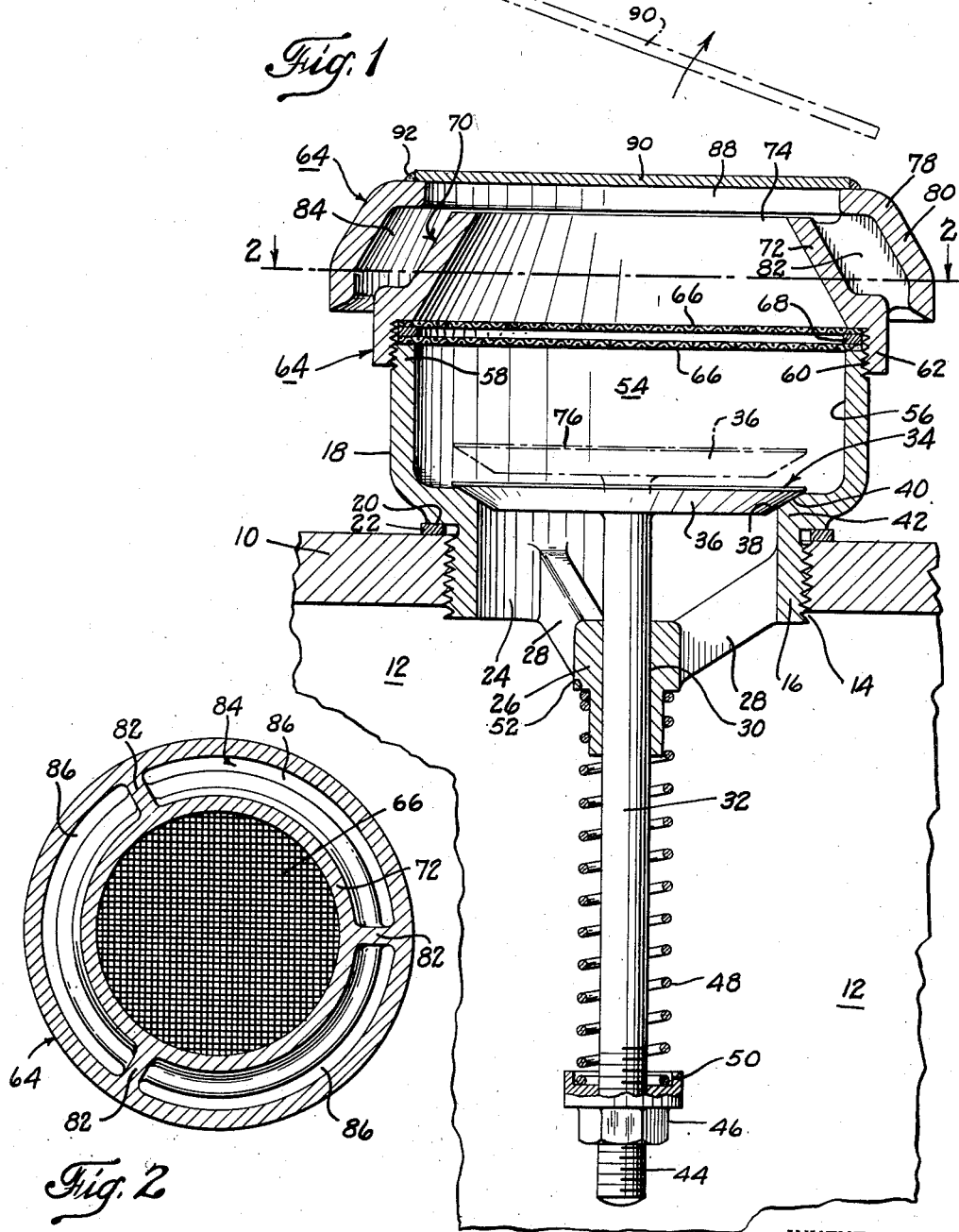

United States Patent Office

2,821,991
Patented Feb. 4, 1958

2,821,991

RELIEF VALVE

Robert D. Marx, Valley Stream, N. Y.

Application November 18, 1954, Serial No. 469,589

9 Claims. (Cl. 137—73)

The invention relates to valves and more particularly to relief valves for fuel tanks.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

It is customary to provide fuel tanks with relief valves in order to provide means for dissipating the vapors distilled off from the fuel in case of fire. Heretofore, it has been the usual practice to use relief valves having a dome directly over the valve, the purpose of the dome being to protect the valve and valve seat from injury and to prevent dirt and foreign particles from lodging between the valve and the valve seal. But the placement of the dome over the valve also has the effect of deflecting the escaping vapors downwardly over the sides of the tanks. As the vapors leave the tanks they are ignited by the fire and due to the close proximity with the sides and top of the fuel tank heat the remaining fuel in the tank to a high degree thereby distilling off at a faster rate additional fuel vapors which also ignite and further heat the fuel in the tank. The heat of the burning vapors thus acts to regenerate a fire of greater intensity which before long "runs wild" and gets completely out of control.

It is the object of the present invention to provide a safety relief valve for fuel tanks which will not dissipate the burning vapors in such a way as to increase the amount of fuel vapor leaving the tank, but which will direct the escaping vapors upwardly away from the tank with great velocity. A further object of the invention is to provide such a relief valve without sacrificing the advantages of the dome construction. Additionally the invention has for its object the provision of a relief valve which will insure the mixture of the escaping vapors with a sufficient amount of air to insure complete smoke-free combustion. Still another object of the invention is to provide a relief valve which will prevent the vapors from burning back into the tank and causing an explosion.

The foregoing objects are achieved by the applicant's relief valve which briefly comprises a casing adapted to be secured to the upper surface of a fuel tank. A spring-loaded relief valve is located in the lower portion of the casing adjacent the tank and serves to control the flow of fuel vapors outwardly from the tank, the valve being designed to open upon a predetermined pressure value in the tank. The casing immediately above the relief valve is shaped to form an upwardly directed passageway having a substantially constant diameter and an area at least as great as the fully opened area of the relief valve, said passageway constituting a conduit for conducting the escaping fuel vapors upwardly away from the tank. In order to avoid turbulent flow of the vapors the inner surface of the passageway is provided with a smooth surface and is free of all projections and recesses. A cover in the form of a dome-shaped casing having a downwardly-turned flange extending below the edge of the upper end of the passageway is joined thereto at a spaced distance to protect the valve and to prevent dirt and foreign matter from collecting in the passageway. An opening is provided in the central portion of the dome immediately above the open end of the passageway but is normally covered by a blow-out disk secured to the dome casing by fusible bonding material. When the hot vapors open the relief valve they also melt the bonding material around the disk and blow the disk off of the dome. A pair of fire screens mounted in the passageway adjacent the central portion of the casing prevent the fire from entering the fuel tank.

In the preferred form of the invention the outer end portions of the passageway are fashioned in the shape of a nozzle, or jet by providing a truncated conical sleeve on the upper end of the passageway, which increases the upward velocity of the vapors leaving the tank. The outer sloping surfaces of the nozzle, together with the flange, or skirt, of the dome define a substantially annular vent through which air is drawn by the upwardly-directed fuel vapors, and introduced into the fuel vapors without turbulence, said vent being large enough to furnish enough air to completely burn the vapors and thereby avoid the usual black fire-balling smoke so characteristic of fuel fires.

It will be understood that the foregoing general description and the following detailed description as well are exemplary and explanatory of the invention but are not restrictive thereof.

Of the drawings:

Fig. 1 is a vertical sectional view through the center of a valve constructed in accordance with the teachings of the invention showing the positioning of the valve with respect to the fuel tank, and Fig. 2 is a transverse sectional view taken through Fig. 1 on the line 2—2 looking in the direction of the arrows.

Referring now to the drawings for a detailed description of a preferred embodiment of the applicant's invention there is shown in Fig. 1 a part of the upper portion of the fuel tank, the tank being designated by the numeral 10 and the chamber for the fuel by the numeral 12. A threaded opening 14 is provided in the tank at its upper-most portion and is adapted to receive the threaded portion 16 of the casing 18 of the relief valve. The valve is threaded into the opening in the tank until a bearing surface 20 immediately adjacent the threaded portion 16 is brought into bearing contact with a compressible washer 22 so as to form a seal between the valve and the tank top. The interior of the threaded portion is provided with a cylindrical opening 24 having a central boss 26 concentrically mounted therewithin and connected thereto by arms 28. An opening 30 is provided in the central boss 26 to receive the cylindrical stem 32 of a pressure relief valve 34, the stem being provided, at one end, with a substantially flat disk type valve 36 having bevelled surfaces 38 for engagement with correspondingly bevelled surfaces 40 on the upper and inner portions 42 of the cylindrical opening 24 and, at its opposite end, with a threaded portion 44 adapted to receive an adjusting nut 46 for a compression spring 48 mounted about the stem 32. The nut 46 is provided with a recess 50 to receive one end of the spring while the opposite end of the spring bears against an abutment 52 on the central boss 26. The action of the spring is to constantly urge the valve 36 into engagement with the valve seat 40, the force of the spring 48 being varied according to the position of the nut 46 with respect to the stem 32. Immediately above the cylindrical opening 24 the valve casing 18 is shaped to form a somewhat larger and upwardly directed passageway 54 of constant diameter having a smooth internal bore 56. The upper portion 58 of this part of the valve casing 18 is provided with threads 60 adapted to receive the internal threaded portion 62 of a dome casing 64. A pair of fire screens 66, of substantially the same diameter as the casing 18 and separated by a spacing member 68, are inserted between the valve casing 18 and the dome casing 64 and serve to prevent the entrance of flame into the fuel tank.

The dome casing 64 comprises a nozzle section 70 which, in the form of the invention shown in the drawings, constitutes an upwardly-tapering truncated, conically-shaped sleeve 72 which terminates in an opening 74 having an area at least as great as the open area of the valve 36 when it is in its fully opened position indicated by the dot-dash lines 76. A circular cover, or dome, 78 having a downwardly turned flange 80 is joined to the nozzle section 70 by means of arms 82 which space it therefrom so as to form a substantially annular vent 84 of three arcuate sections 86. In the center of the dome 78 there is provided an opening 88 of somewhat greater diameter than the opening 74 of the nozzle 70. Normally, the opening 88 is covered by a thin disk 90 having a diameter slightly larger than the diameter of the opening and being secured to the dome casing 78 by means of fusible bonding material 92 adapted to melt upon the application of heat. The disk 90 is formed from any suitable material having a high coefficient of heat transmission.

In the event of a fire adjacent the tank the valve functions as follows: as the fuel heats within the tank the pressure rises and soon reaches the point where it is sufficient to open the valve 36. The fuel vapors distilled off by the heat pass through the cylindrical opening 24 and by the valve 36 into the upper passageway 54. Because the internal surface 56 of this passageway is smooth and entirely free from projections and recesses the flow of the fuel vapors in this passageway is substantially laminar, that is, without any appreciable mount of turbulence. After passing through the fire screens 66 the vapors enter the nozzle section 70 where due to the decrease in the diameter of the sleeve 72 the velocity of the vapors is materially increased and a jet of the fuel vapors is formed. Upon striking the thin disk 90 covering the opening 88 in the dome 78 the heat of the vapors is quickly transferred to the fusible bonding material 92 joining the disk to the dome and within a matter of a few moments the bonding material is melted and the disk is blown off of the opening by the pressure of the escaping vapors. After the disk has been blown off the velocity of the vapors emerging from the nozzle 70 carry them upwardly away from the fuel tank 10 so that the heat of these burning vapors will not be transmitted to the tank. As the upward velocity of the vapors emerging from the nozzle is very substantial the jet has the additional effect of sucking air through the bottom openings of the annular vent 84, up through the passageway 86 formed between the nozzle 70 and the flange 80 of the dome 78 where the air smoothly enters the escaping vapors in sufficient quantities to permit the vapors to be completely burned thereby avoiding the usual black fire-balling smoke characteristic of fuel fires.

After the fire is extinguished the valve is restored to its original operative condition by replacing the disk and bonding it to the dome.

The invention in its broader aspects is not limited to the specific mechanisms shown and described but departures may be made therefrom within the scope of the accompanying claims without departing from the principles of the invention and without sacrificing its chief advantages.

I claim:
1. A relief valve for fuel tanks comprising a casing, a valve in the casing adapted to open to permit the escape of volatile vapors, an opening in the casing adjacent to and immediately above the valve, a cover for the opening having a disk adapted to be removed by the escaping vapors said cover being spaced from said opening to form a vent, and a tapered nozzle between the valve and the opening to form a jet of the escaping vapors.

2. A relief valve as set forth in claim 1 in which the casing between the opening, nozzle and valve is free of restrictions and turbulence-producing projections and the area of the opening and the nozzle is equal to or greater than the open area of the valve.

3. A relief valve as set forth in claim 1 in which the nozzle comprises a truncated conically-shaped sleeve.

4. A relief valve as set forth in claim 3 in which the cover is shaped to form a skirt around, but spaced from, the truncated conically-shaped sleeve thereby forming said vent as a substantially annular passage terminating adjacent the narrow end of the nozzle.

5. A relief valve as set forth in claim 3 having a pair of fire screens located in the casing between the sleeve and the valve.

6. A relief valve for fuel tanks comprising a casing adapted at one end to be secured to a tank and having a passageway therein in communication with the tank, a valve in the casing to control the passageway in the casing and fluid flow therethrough, said casing having a hollow central section extending above the valve to define a substantially unrestricted passageway and terminating in an open end, a cover for the open end of said casing section spaced therefrom to form a vent adjacent said open end whereby air may be induced into the escaping fuel vapors, said cover having an opening immediately above the open end of the casing section, and a disk covering the opening in the cover and removably secured thereto.

7. A relief valve as set forth in claim 6 in which the open end of the casing section is formed by a tapering nozzle.

8. A relief valve as set forth in claim 7 in which the hollow central casing section is cylindrical and the opening in the cover is greater in diameter than the opening of the nozzle.

9. A relief valve for fuel tanks comprising a casing adapted at one end to be secured to a fuel tank and having a passageway therein in communication with the tank, a valve in the casing to control said passageway and fluid flow therethrough, said casing having an enlarged hollow cylindrical central section extending above the valve defining a substantially unrestricted passageway and an inwardly tapering end portion terminating in an opening and forming an exit nozzle for the fluid in the aforementioned passageways, a cover for the casing having an opening immediately above the opening in the end portion of the casing, and a downwardly turned flange spaced from the tapering end portion of the casing and forming therewith an annular air vent, and a disk covering the opening in the cover and fusibly bonded thereto.

References Cited in the file of this patent
UNITED STATES PATENTS

| 688,863 | Kemp | Dec. 17, 1901 |
| 928,660 | Ippolito | July 20, 1909 |
| 1,730,237 | Patten | Oct. 1, 1929 |
| 1,902,258 | Muller | Mar. 21, 1933 |
| 2,000,431 | Aumack | May 7, 1935 |
| 2,036,391 | Bradley | Apr. 7, 1936 |
| 2,273,737 | Snyder | Feb. 17, 1942 |

FOREIGN PATENTS

| 136,663 | Great Britain | Dec. 24, 1919 |